US009766364B2

(12) United States Patent
Hickman (10) Patent No.: US 9,766,364 B2
(45) Date of Patent: Sep. 19, 2017

(54) METHOD AND APPARATUS FOR CONTROLLING OIL WELL DRILL SITE SYSTEMS

(71) Applicant: Don Darrell Hickman, Williston, ND (US)

(72) Inventor: Don Darrell Hickman, Williston, ND (US)

(*) Notice: Subject to any disclaimer, the term of this patent is extended or adjusted under 35 U.S.C. 154(b) by 109 days.

(21) Appl. No.: 14/055,627

(22) Filed: Oct. 16, 2013

(65) Prior Publication Data

US 2014/0104074 A1 Apr. 17, 2014

Related U.S. Application Data

(60) Provisional application No. 61/714,645, filed on Oct. 16, 2012.

(51) Int. Cl.
| | | |
|---|---|---|
| *G01V 3/00* | (2006.01) | |
| *G01V 3/30* | (2006.01) | |
| *E21B 33/035* | (2006.01) | |
| *E21B 44/00* | (2006.01) | |

(52) U.S. Cl.
CPC ............ *G01V 3/30* (2013.01); *E21B 33/0355* (2013.01); *E21B 44/00* (2013.01)

(58) Field of Classification Search
CPC ...... E21B 47/122; E21B 47/12; E21B 17/003; E21B 44/00; E21B 17/028; G01V 11/002; G01V 3/30

USPC ........................................... 340/854.4–855.2
See application file for complete search history.

(56) References Cited

U.S. PATENT DOCUMENTS

| | | | |
|---|---|---|---|
| 6,212,763 B1 | 4/2001 | Newman | |
| 6,758,095 B2 | 7/2004 | Newman | |
| 6,967,589 B1* | 11/2005 | Peters | ..................... E21B 47/00 166/250.15 |
| 7,519,508 B2 | 4/2009 | Newman | |
| 7,631,563 B2* | 12/2009 | Newman | ............... E21B 19/165 73/862.25 |
| 8,286,727 B2 | 10/2012 | Hickman | |
| 2013/0033381 A1* | 2/2013 | Breed | ..................... B60T 1/005 340/568.1 |

\* cited by examiner

*Primary Examiner* — Kerri McNally
*Assistant Examiner* — Sharmin Akhter
(74) *Attorney, Agent, or Firm* — Merchant & Gould P.C.

(57) ABSTRACT

A control system for a well site, the well site includes connectable elements configured for inserting down a well. An explosion hazard zone surrounds the well site. A first electronics enclosure is remote from the explosion hazard zone and houses a first electronics module. A remote electronics control module is spaced apart from the first electronics housing and a remote hydraulics module removed from the first electronics module and the hazard zone module. The control system includes a human machine interface including a display and input. A central communications module is in wireless communication with the first electronics control module, the remote electronics module, and a remote location. A processor is in one or more of the first electronics module, the communications module or the human machine interface.

7 Claims, 13 Drawing Sheets

FIG. 7C RIGHT SIDE VIEW

FIG. 7B FRONT VIEW

FRONT VIEW

FIG. 8B

RIGHT SIDE VIEW

METHOD AND APPARATUS FOR CONTROLLING OIL WELL DRILL SITE SYSTEMS

BACKGROUND OF THE INVENTION

Field of the Invention

The present invention relates to a control system and control method for an oil well site and in particular to a system for providing automation and automatic wireless control of operations at a well site.

Description of the Prior Art

Management of elements used for drilling and pumping oil from well sites has historically been largely performed manually. The harsh conditions and hazards present special challenges for connecting and protecting control electronics. Moreover, areas around the well head require certain explosion proof rated components in many uses. Wiring, switches and other connections are subject to extremely harsh and often corrosive conditions and are subject to a higher failure rate. Moreover, control equipment is also subject to harsh operating conditions and also has a higher incidence of problems.

In addition, the information gathered relating to various parameters of drilling and connecting elements such as tubing or sucker rods has been limited for prior art systems. Even if such information exists, accessing and analyzing the information for modifying operations have also been limited.

It can be seen then that a new and improved control and data system for oil well sites is needed. Such a system should provide for wireless communication between various components to avoid the harsh conditions and possible damage to components and connections. Moreover, the components that are at the well site should be protected in enclosures and where necessary, in explosion proof enclosures. Such a system should also provide for collecting data and real time control and reporting of various conditions associated with the well site. The data should also be storable for further analysis at a later time and should also be accessible at remote locations. The present invention addresses these as well as other problems associated with controls at oil well sites.

SUMMARY OF THE INVENTION

The present invention is directed to a wireless and automatic control and data system for oil well site control and operations. The control system includes various subsystems disposed as modules in enclosures and where possible, placed remotely from a hazardous explosion zone surrounding the well head. Wireless communication through Bluetooth, Ethernet, cellular connections or other systems provides for communication and avoids damage to wiring and other components that conventional systems are prone to.

One control module is placed proximate the tong for the drill rig in a hazardous explosion zone. Explosion proof valves and control components are utilized and in communication with the tong and to control the tong. The various module elements may be enclosed in an explosion rated housing.

The first electronics module is located outside the hazardous explosion zone in a sealed enclosure and is connected to the tong control system module. The first electronics control module includes an Ethernet programmable controller and provides for wireless communication to other control modules.

A remote hydraulics module and a remote electronics module are spaced away from the well head at an opposite end of the drill rig. The two enclosures include wireless communication, such as Bluetooth and cellular connections. The remote electronics module is in communication with the first electronics module and includes additional controls, relays and processors. By positioning the modules away from the explosion zone, less protection is required at the remote location. The remote electronics module provides a cellular connection, radio or other wireless communication method for providing data and receiving instructions from a remote location. The remote electronics module acts as a central hub to coordinate control.

A human machine interface includes a screen suitable for use even in sunlight such as an industrial touch screen so that operations may be monitored at the well site and various data from pressure transducers, load sensors and flow sensors provide information on operations is displayed to operators. The human machine interface also includes a processor and may be connected to a further enclosure providing emergency stops and other switches. The interface is preferably mounted outside the hazardous zone but within sight of the well head and tong so that operators may observe operations while also monitoring the view screen.

The wireless technologies also provide for automation of the operations at the well site. The tong is controllable by processors in the electronics modules, actuating control valves and flow controls based on sensors, transducers and meters. Moreover, pressure transducers provide information regarding the stresses on the rig and provide alerts and alarms should problems be encountered. The present system also provides for acquiring data in multiple aspects of operations and provides for making real time adjustments. The information may be stored as well as being transmitted to remote locations or portable electronic devices. With such a system, improved operations are possible with operations automated as compared to conventional manually operated rigs. In addition to efficiency, safety and reliability are also improved as various components are removed from areas near the well head with control accomplished remotely.

These features of novelty and various other advantages that characterize the invention are pointed out with particularity in the claims annexed hereto and forming a part hereof. However, for a better understanding of the invention, its advantages, and the objects obtained by its use, reference should be made to the drawings that form a further part hereof, and to the accompanying descriptive matter, in which there is illustrated and described a preferred embodiment of the invention.

BRIEF DESCRIPTION OF THE DRAWINGS

Referring now to the drawings, wherein like reference letters and numerals indicate corresponding structure throughout the several views:

FIG. 6E is a wiring diagram for controlling the hydraulic equipment shown in FIGS. 6A-6D;

DETAILED DESCRIPTION OF THE PREFERRED EMBODIMENT

Figure 1:
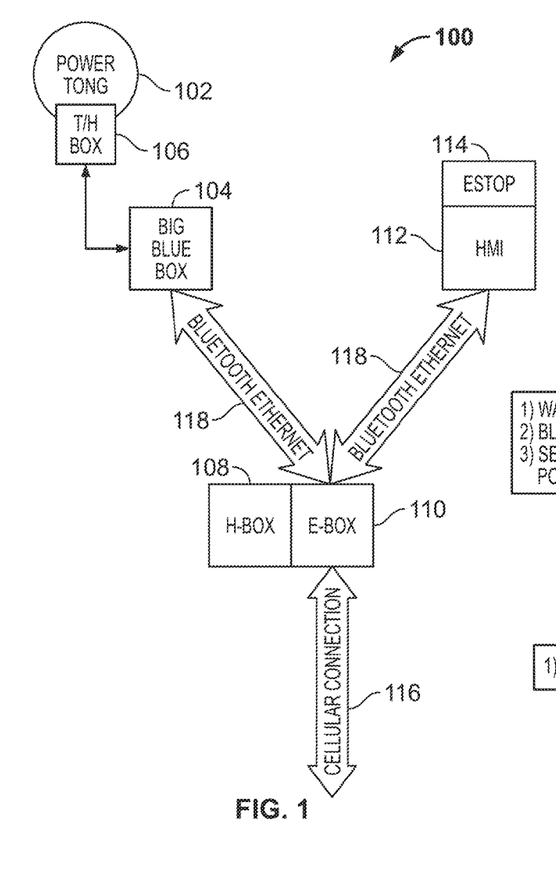
FIG. 1 is a diagrammatic view of a system for controlling well equipment according to the principles of the present invention.
Figure 2:
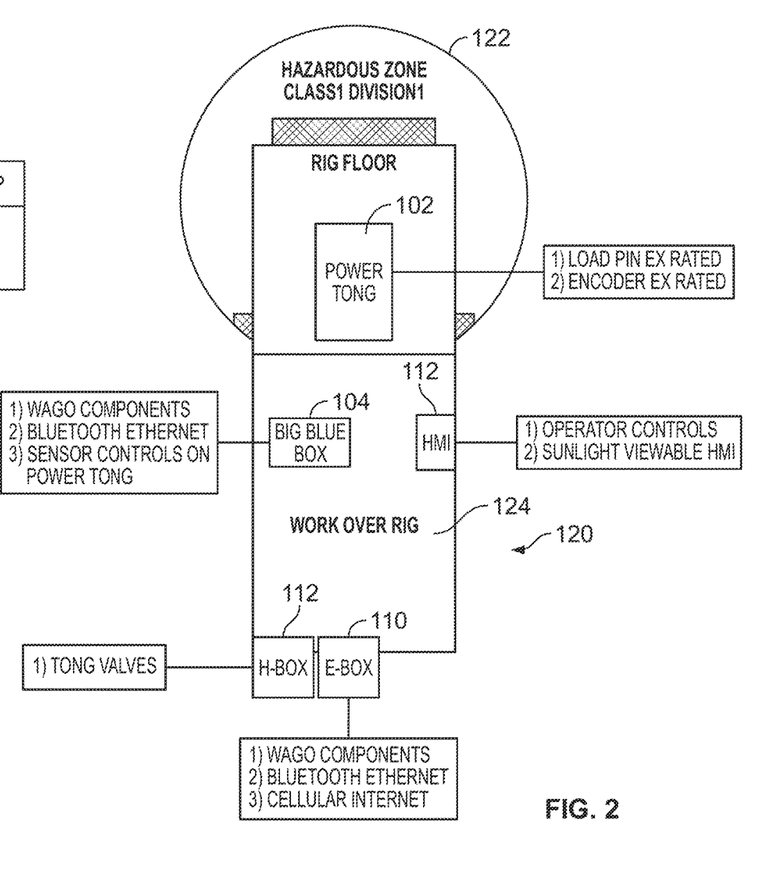
FIG. 2 is a diagrammatic view showing the layout of the system of FIG. 1.

Referring now to the drawings and in particular to FIGS. 1 and 2, there is shown a control system 100 for acquiring and analyzing data to control equipment at a well site. The control system 100 includes multiple protected subsystems or modules. A tong hydraulics module 106 within the hazardous explosion zone 122 is protected in an explosion rated box 106A. Other components are located remotely from the hazardous explosion zone 122. The other control components are placed in enclosures to protect them from the elements and communicate via Bluetooth or other wireless communication. Therefore, problems associated with corrosion or other damage to wiring, relays and switches are eliminated. Moreover, the various components provide for automatic control of the tong 102 and automatic recording of operational data. The information is forwarded to a human machine interface 112 with a processor and may also be transmitted to remove locations for real time monitoring and automation of the various processes at the well site. It can be appreciated that the hydraulic enclosure for the tong 102 is within the hazardous explosion zone but the other subsystems or modules are removed from the zone, so that this equipment need only comply with lower hazard ratings and standards.

Figure 10:
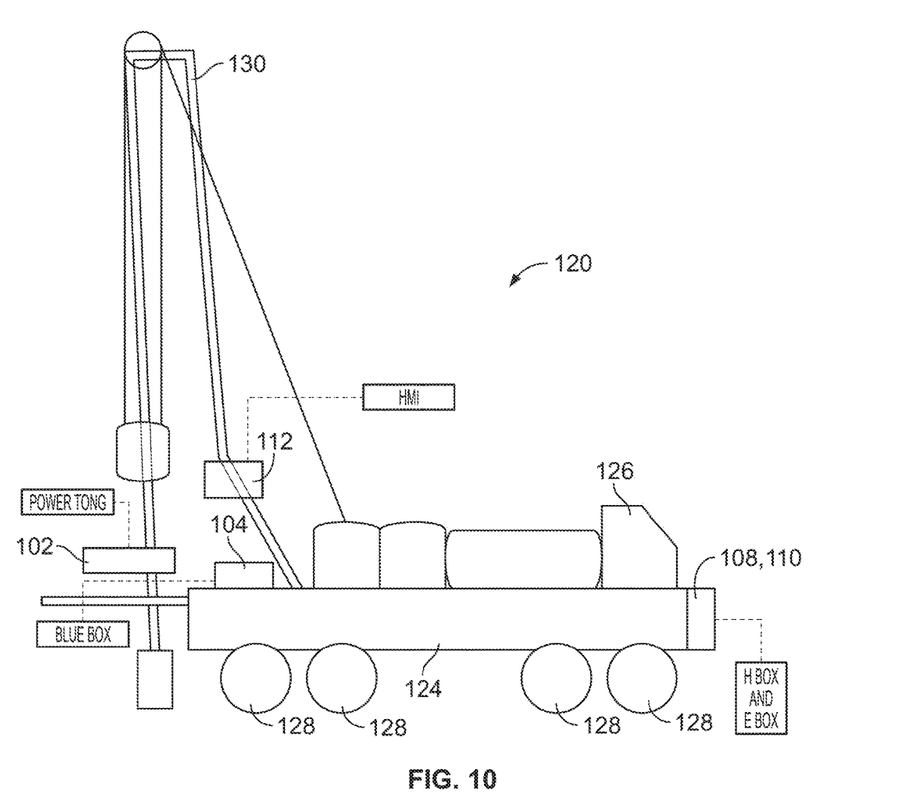
FIG. 10 is a side elevational view of a rig including the system shown in FIG. 1.

As shown in FIG. 10, the system 100 is mounted to a conventional rig 120 in one embodiment. The rig 120 typically includes a frame or floor 124 serving as a base for all other components. Such a rig 120 includes wheels 128 for driving the rig to the well site. A cab 126 is typically at one end of the rig 120 while the mast or derrick 130 is raised at the opposite end. A hydraulic enclosure 108A and electronics enclosure 110A are mounted for example, on the front of the rig 120. A main electronics module 104 may be hard wired to the tong hydraulic module 106. The human machine interface 112 may have a screen and a keypad accessible within visual range of the well head and also includes an emergency stop box 114A often mounted to the human machine interface 112 or within reach of an operator. The communication between the various subsystems are wireless except for the explosion rated hard wiring required for connection to the tong hydraulic module 106 in the explosion zone. Bluetooth Ethernet type communications 118 are provided between the components to eliminate hard wiring and associated drawbacks, but other wireless technologies could also be used. Moreover, an electronics module 110 may have equipment with a cellular connection for transmitting and receiving data, commands and other information to and from a remote control center at another location. Such a configuration provides for monitoring by owners, customers and others at locations remote from the well site and decreases the number of personnel required at the well site.

Figure 4A:
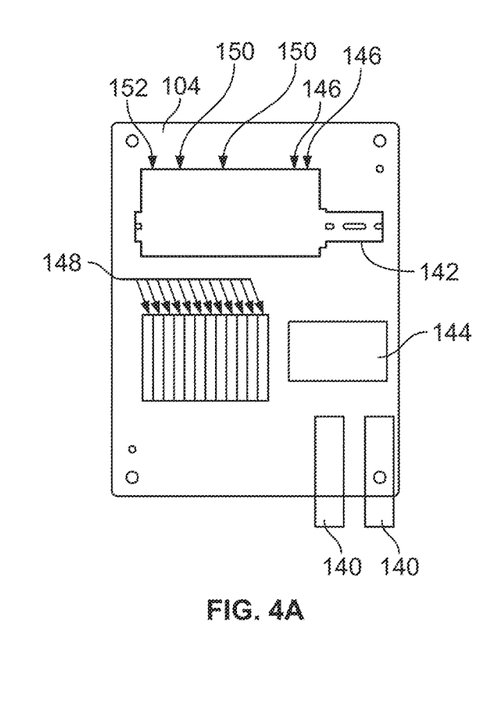
FIGS. 4A, 4B and 4C are diagrammatic views of a first housing for electronics for the system shown in FIG. 1.
Figure 4B:
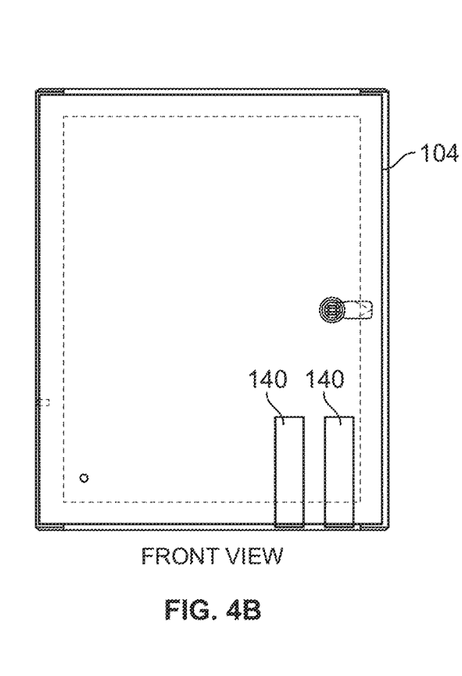
Figure 4C:
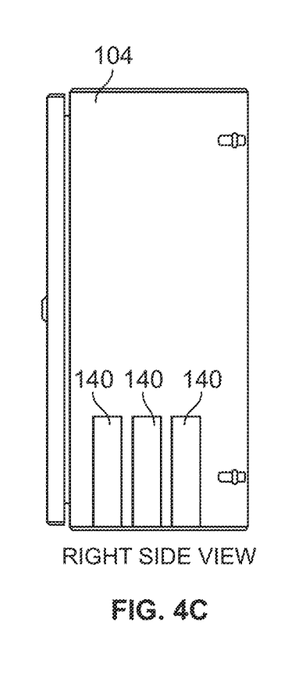
Figure 5A:
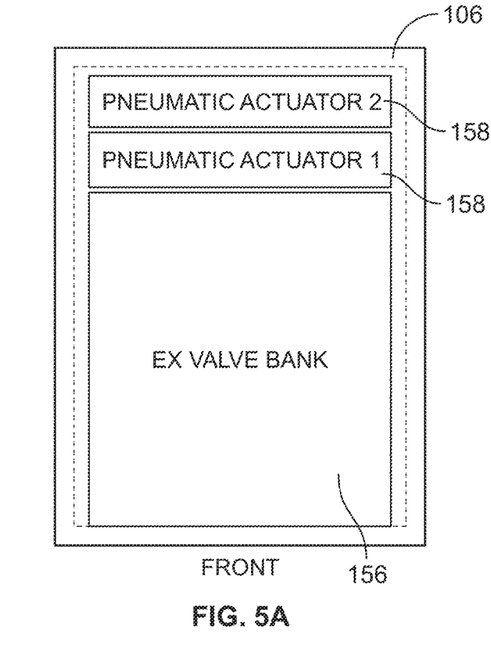
FIGS. 5A, 5B, 5C, 5D and 5E are views of a second housing containing explosion rated components for the system shown in FIG. 1.
Figure 5B:
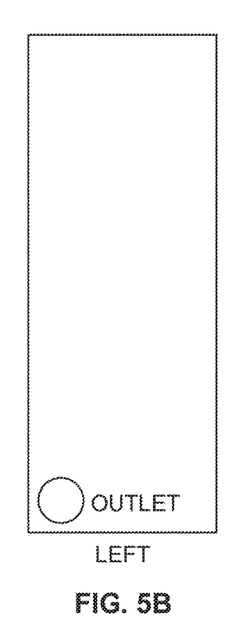
Figure 5C:
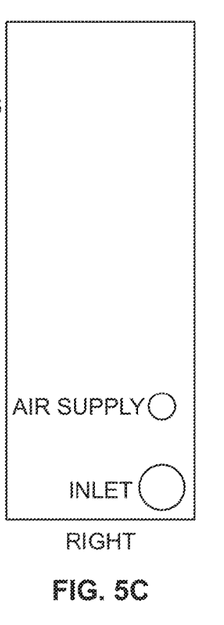
Figure 5D:
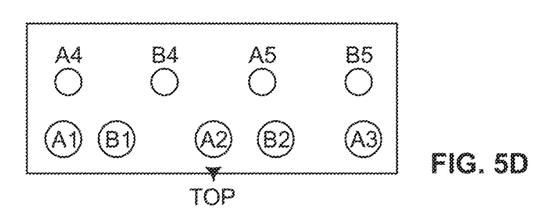
Figure 5E:
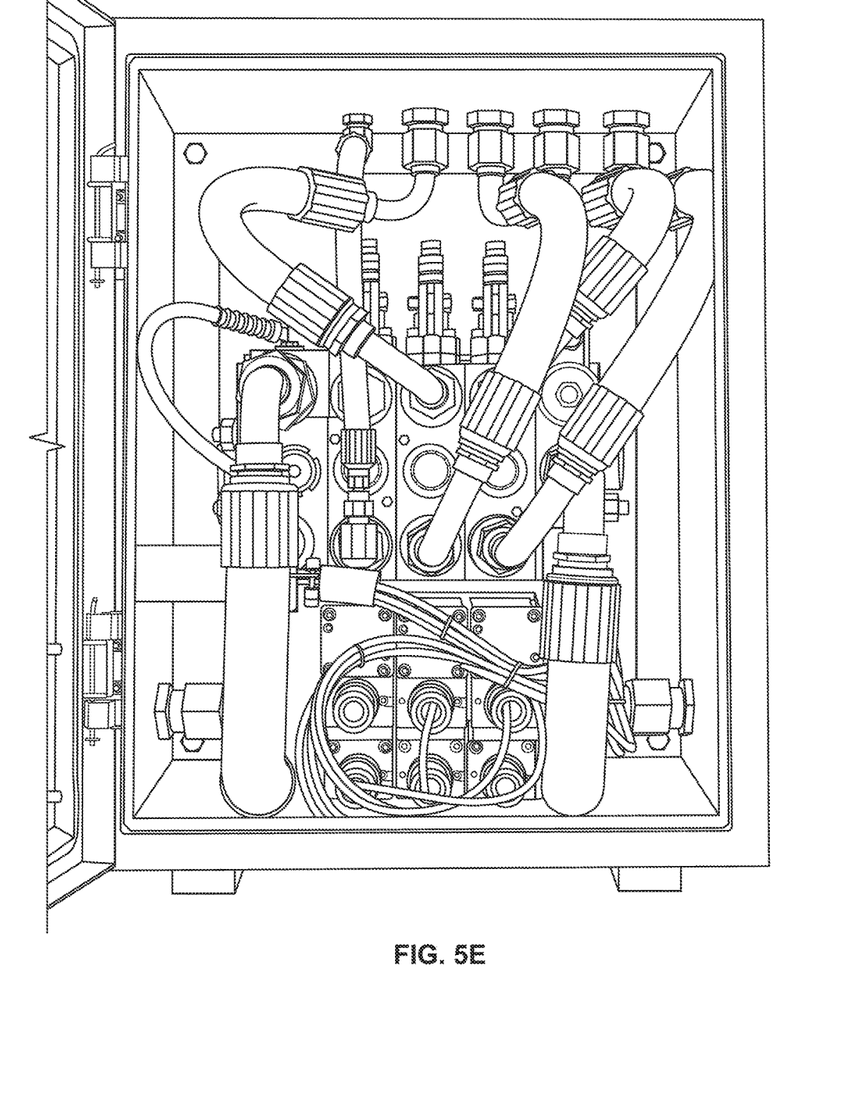

The control module 104 is typically mounted so as to be in direct electrical communication with the enclosed tong hydraulic module 106 and its various components. Referring to FIGS. 4A, 4B and 4C, the first electronics subsystem 104 includes a sealed cable 142 extending to the tong 102 and the components in the tong hydraulic enclosure 106A. Moreover, an enclosure 104A of module 104 houses a bidirectional Bluetooth communication system 146, a relay bank 148 and one or more power supplies 150. Moreover, also within the box is an Ethernet system 152 and a relay bank 148. Pressure transducers 140 are positioned to sense various weights and fluid pressures associated with the well site operations. An Ethernet programmable controller such as may be available from Wago® Corporation is combined with the other components and provides for a system that can be controlled remotely and can also be programmed for automatic control of operations.

For some environments and/or applications the tong hydraulic enclosure 106A is needed that is explosion rated.

The tong hydraulic module 106 connects to the tong 102 and supplies power to hydraulic motors and to actuate and stop the tong 102. As shown in FIGS. 5A-5E, the tong hydraulic enclosure 106A includes pneumatic actuators 158 as well as explosion proof valves 156. The actuators 158 provide for operation of the tong within the hazardous explosion zone. The enclosure 106A has an explosion proof housing that meets class 1 standards. Moreover, the actuators 158 and valves 156 are controlled and directly connected to the electronics module 104, which is outside the hazardous explosion zone.

Figure 6A:
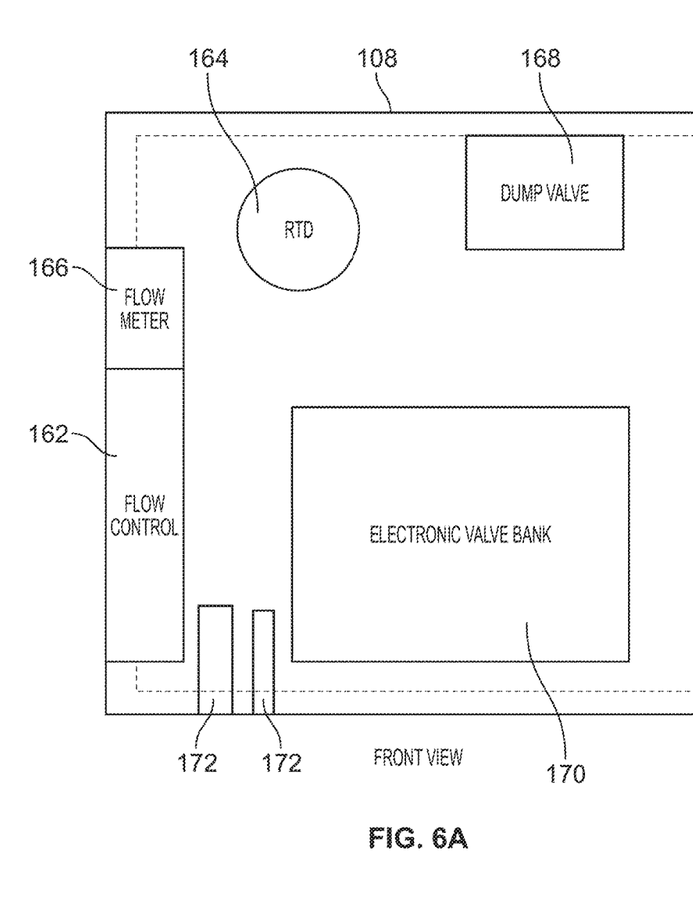
FIGS. 6A and 6B are diagrammatic views of a third housing containing hydraulic equipment for the system shown in FIG. 1.
Figure 6B:
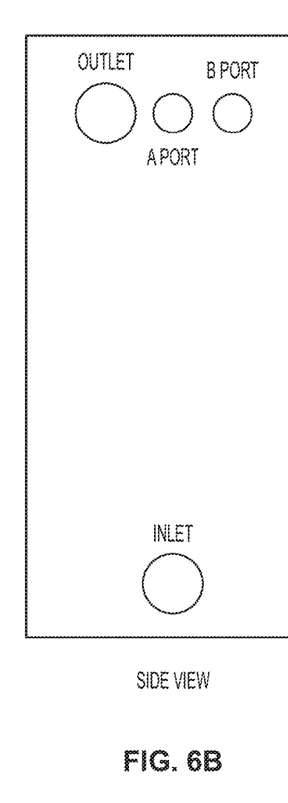
Figure 6C:
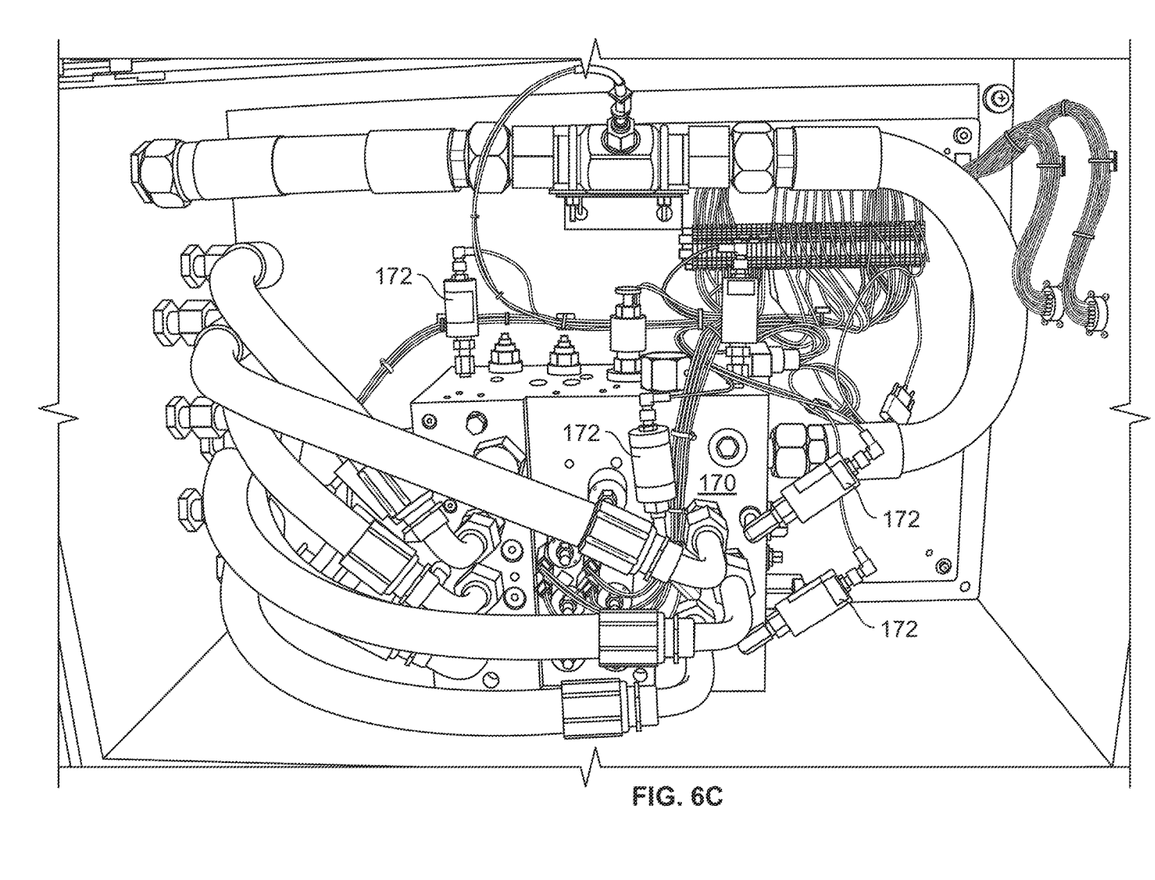
FIG. 6C is an interior view of the third housing and the hydraulic equipment shown in FIGS. 6A and 6B.
Figure 6D:
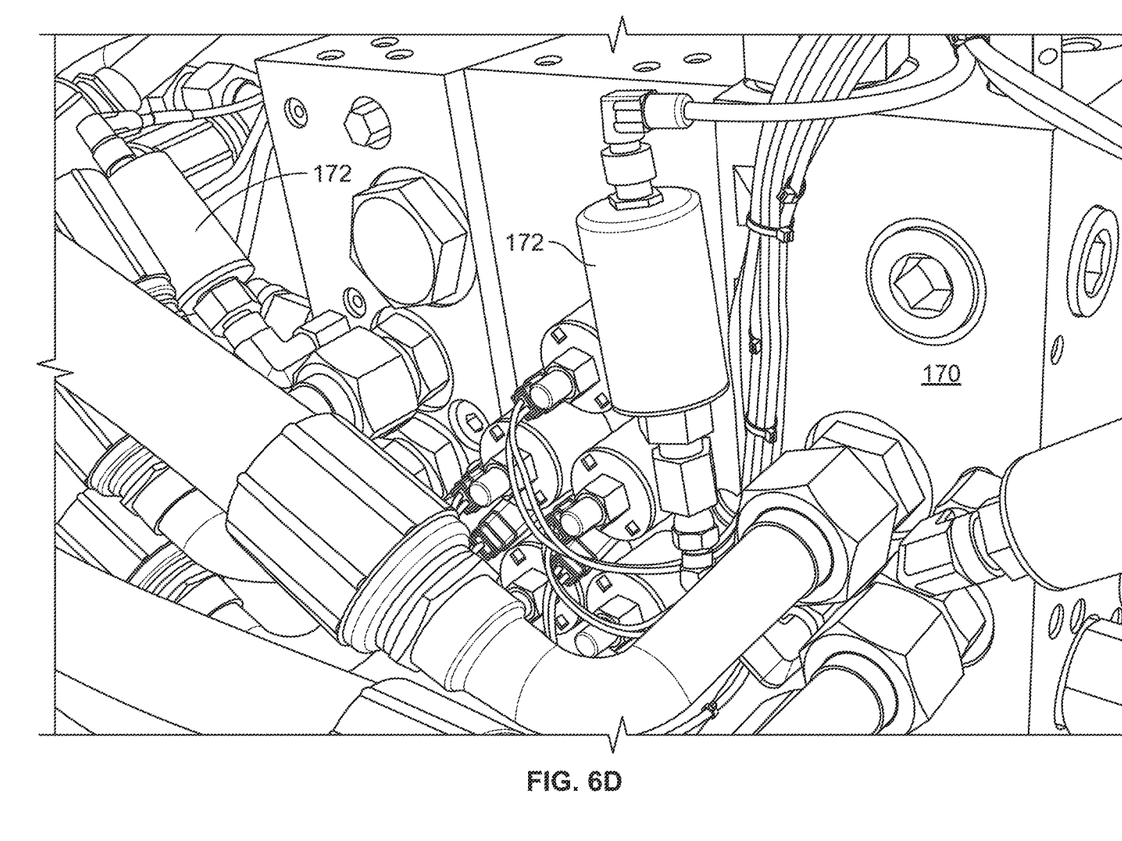
FIG. 6D is a detail view of the hydraulic equipment shown in FIG. 6C.

Referring to FIGS. 6A, 6B and 6C, the remote hydraulics subsystem 108 is located in the remote hydraulic enclosure 108A. The remote hydraulic module 108 includes a flow meter 166 and a hydraulic flow controller for the tong 162 and a resistive thermal device (RTD). A flow meter 166 is also included in this system. A dump valve 168 and a valve bank 170 also direct and control hydraulic fluid flow. Pressure transducers 172 provide additional information on operating conditions and performance.

Figure 7A:
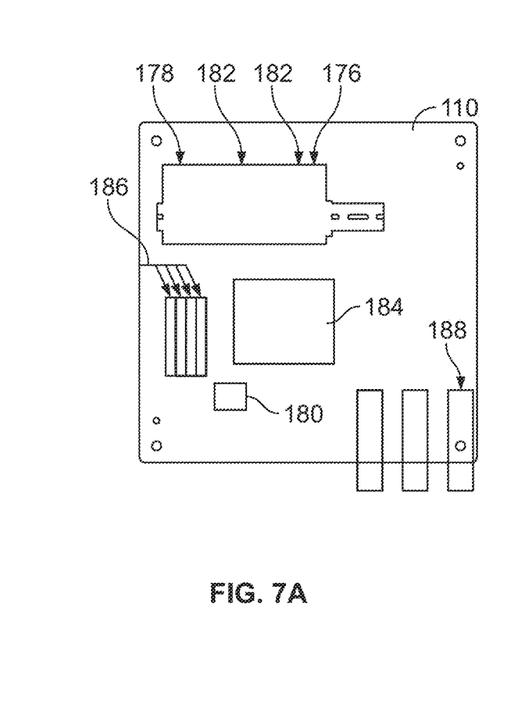
FIGS. 7A, 7B and 7C are diagrammatic views of a fourth housing for electronic equipment located remote from the hazardous explosion zone for the system shown in FIG. 1.
Figure 7B:
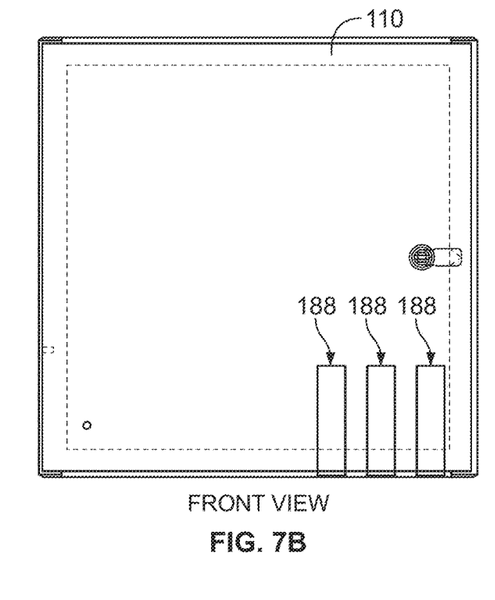
Figure 7C:
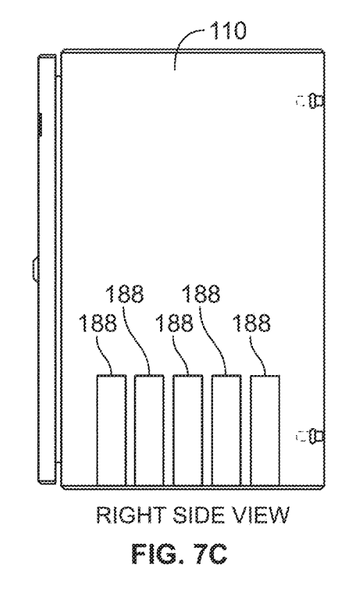

The remote hydraulics subsystem 108 is in the sealed enclosure 108A next to or near the enclosure for the remote electronics module 110. The remote electronics enclosure 110A is shown in FIGS. 7A-7C. The module 110 acts as a central processor and is the central communication hub for the control system 100. The remote electronics system 110 includes a Bluetooth transmitter receiver and a cellular modem. The system also includes a global positioning system 180 and one or more power supplies 182. The remote electronics subsystem 110 also includes a relay bank 186 and one or more pressure transducers 188. An Ethernet programmable controller 184 is connected to the other components. With such a configuration, the communication and control of the other components is automated and wireless. Moreover, data can be provided both to the human machine interface 112 as well as to a remote location for analysis and/or controlling remotely well site operations of the tong 102 and the rig 120. Information can be provided in either direction and control inputs may be received to modify operations parameters.

Figure 8A:
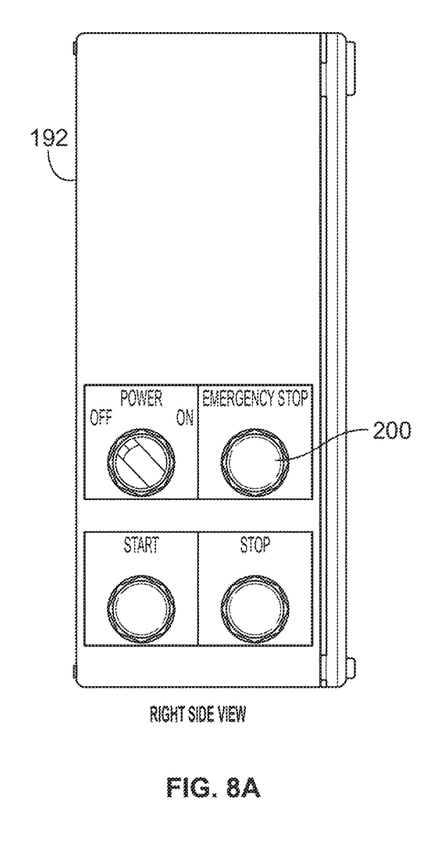
FIGS. 8A, 8B and 8C are diagrammatic views of a fifth housing containing interface equipment for the system shown in FIG. 1.
Figure 8B:
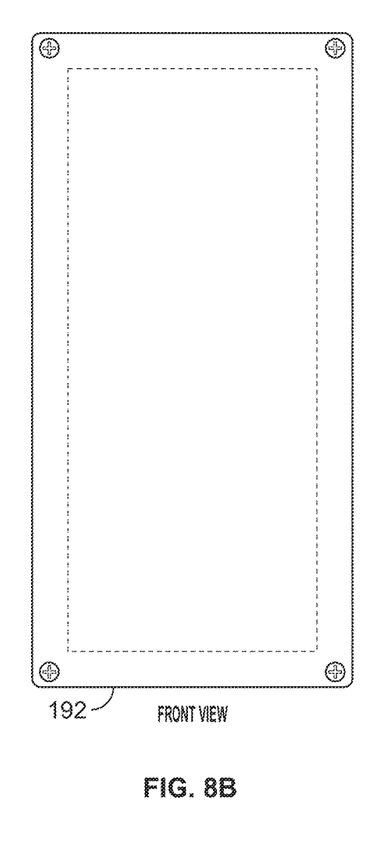
Figure 8C:
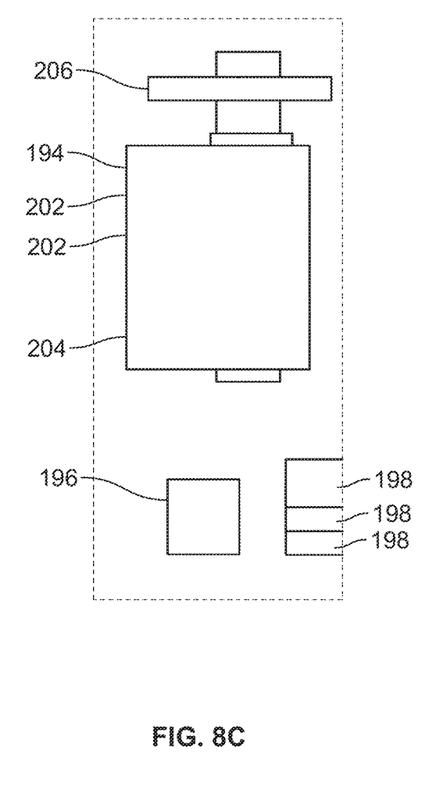

An emergency stop module 114 shown in FIGS. 8A, 8B and 8C has a box 114A mounting to or near the human machine interface 112. The emergency stop enclosure includes explosion rated switches 198 and emergency stop 200. Power supplies 202 provide power at different voltages to the module 114. Ethernet 204 provides for communication with the remote electronics module 110. The module also includes relays 206 and is in direct communication with the human machine interface 112.

Figure 9A:
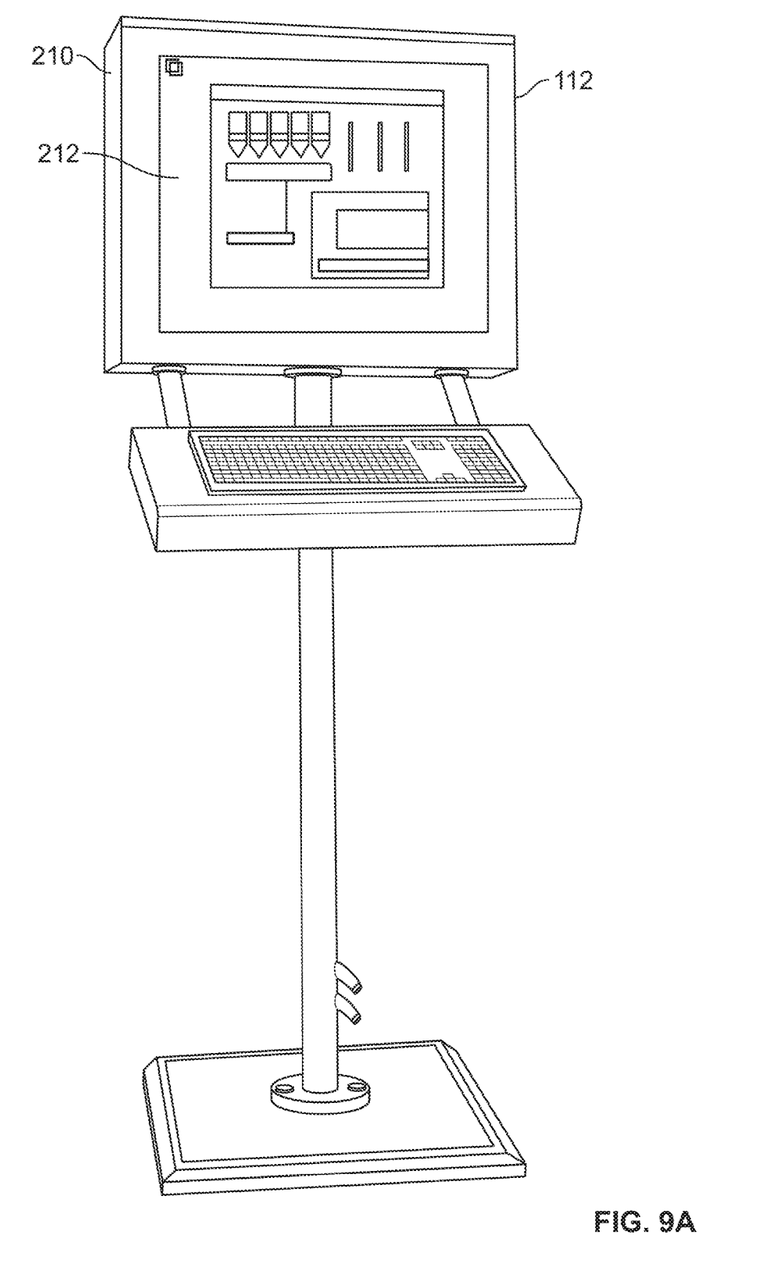
FIG. 9A is a perspective view of a first embodiment of a human machine interface utilized with the fifth housing.

The human machine interface 112, such as the model shown in FIG. 9A, may be an industrial rated computer touch screen or keyboard 212 in a frame 210. The human machine interface 112 is preferably positioned so that it is outside the hazardous zone 122 while providing a view of the well head so an operator is able to view operations while monitoring the human machine interface 112. The operating conditions and parameters may be monitored by an operator on the screen 212 and the operations may be modified by user input through the touch screen or other appropriate keyboard or controller.

Figure 9B:
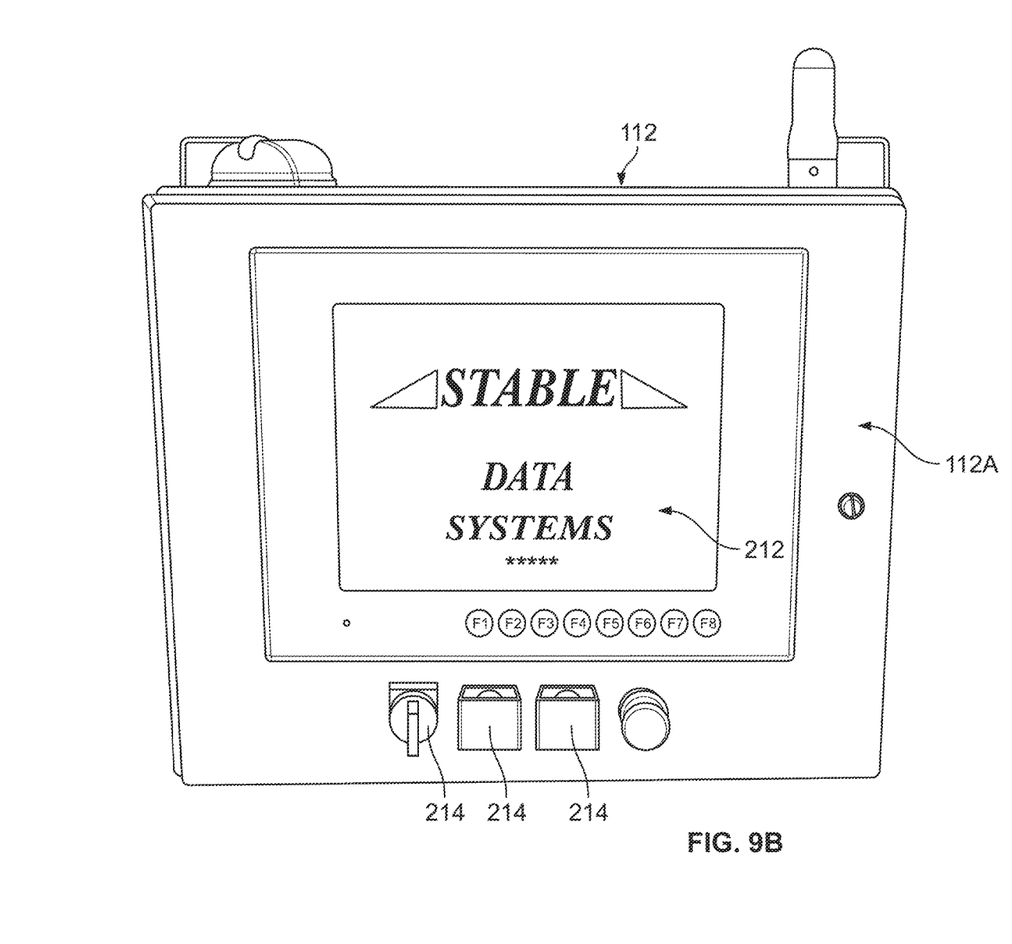
FIG. 9B is a front view of a second embodiment of a human machine interface utilized with the fifth housing.

In an alternate embodiment shown in FIG. 9B, the human machine interface 112 is mounted in a dedicated enclosure 112A. In some embodiments the emergency stop module 114 is also housed in the enclosure 112A. The human machine interface in the dedicated enclosure 112A also includes a touch screen 212 and ports 214 for providing the human interface.

The use of Bluetooth and Ethernet communication systems as well as other connections provide for inputs and displays to the human machine interface 112 as well as to remote monitoring locations and for storage and memory. However, operators may also utilize portable electronic devices such as telephones, PDA's, tablets, laptops etc., to receive information and give commands.

Figure 11:
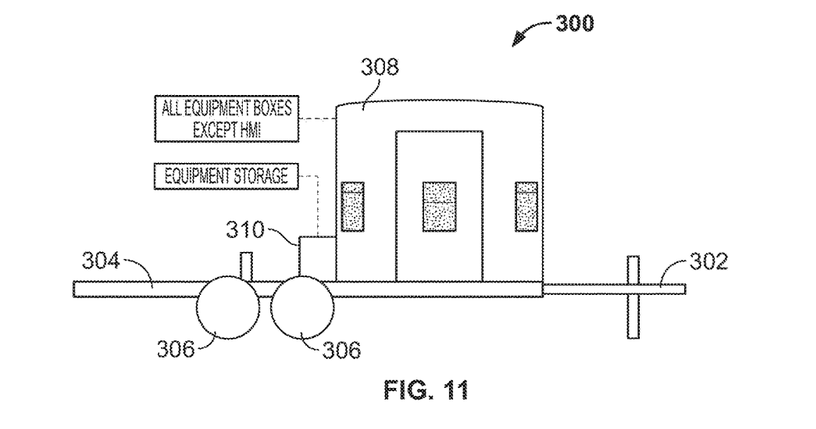
FIG. 11 is a side elevational view of a trailer mounted system for the system shown in FIG. 1 configured for use with a rig.

As shown in FIG. 11, for rigs that do not have the various control modules, but have a tong, a portable trailer 300 may be utilized to provide the various remote modules. The trailer 300 includes a frame 304, a hitch 302 and wheels 306. A remote control module compartment 308 includes the modules shown in FIG. 1, except for the human machine interface. The communication to the tong may be direct with all other modules being remote and in communication with one another. This configuration also provides for safe operation as the trailer is positioned outside the hazardous zone 122. Equipment storage 310 is also provided.

Figure 3:
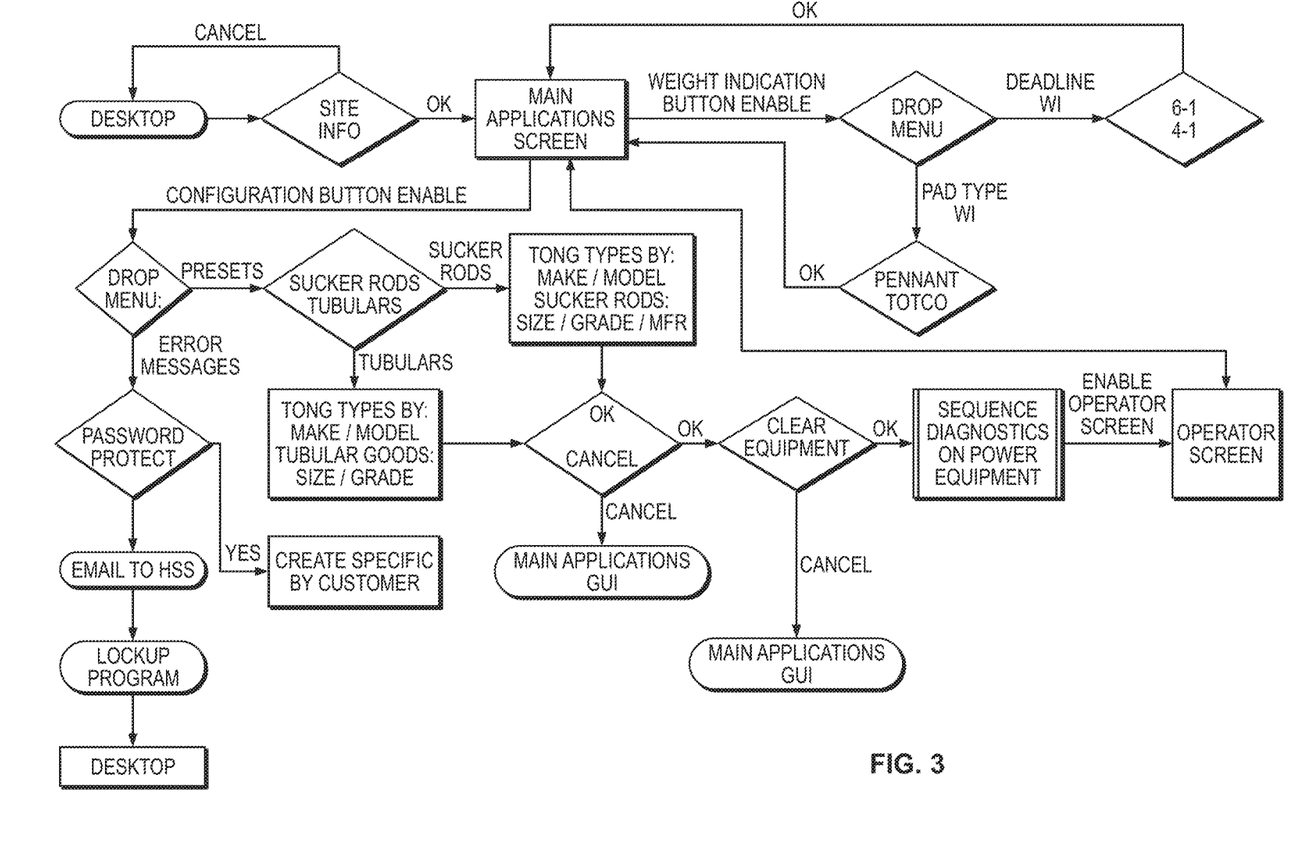
FIG. 3 is a flow diagram for operating the system shown in FIG. 1.

Referring now to FIG. 3, a setup for the system is illustrated. To provide the automatic operation, inputs are made as to the type of rod or tubes being utilized including make, model, size or grade. The human machine interface 112 also provides for pulling up different screens for calibrating the various pieces of equipment prior to operation and for leading operators through equipment checks and diagnostics. Weights and other information from the pressure transducers may also be utilized to set initial conditions prior to operation. However, once all parameters have been input, the human machine interface 112, which may include a processor loaded with appropriate software or connected to a controller with appropriate software in the remote electronics module 110, is able to provide automatic control and operation of the tong and the rig at the well site. Moreover, information and modifications of the tong may be provided to and from remote locations or portable electronic devices. The present system 100 is also able to verify and certify the correctness of connections for tubing and/or rods and that the connecting equipment, such as the tong, is properly calibrated.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A control system for a portable drill rig, the portable drill rig including connectable elements configured for inserting down a well and a tong, the portable drill rig defining an explosion hazard zone, the system comprising:
   a tong hydraulic module mounted in an explosion rated first enclosure at a first location on the portable drill rig within the explosion hazard zone and in fluid communication with the tong;
   a hazard zone module mounted on the portable drill rig including at least one explosion rated valve in fluid communication with the tong hydraulic module;
   a first electronics enclosure mounted on the portable drill rig at a second location remote from the explosion hazard zone and housing a first electronics module and hard wired to the tong hydraulic module;
   a second electronics enclosure containing a control module mounted on the portable drill rig spaced apart from the first electronics enclosure;
   a remote hydraulics module in a sealed enclosure mounted on the portable drill rig proximate the second electronics enclosure and spaced apart from the first electronics module and the hazard zone in hydraulic communication with the tong hydraulic module;
   a human machine interface including a display and input spaced apart from the hazard zone within sight of the portable drill rig;
   a communications module remote from the portable drill rig and in wireless communication with the first electronics module, the remote electronics control module, and a remote location; and
   a processor in one or more of the first electronics module, the communications module or the human machine interface.

2. A control system according to claim 1, further comprising a transmitter reporting information to the remote location.

3. A control system according to claim 2, wherein the remote location comprises a computer readable storage medium.

4. A control system according to claim 3, wherein the computer readable storage medium comprises a database.

5. A control system according to claim 3, wherein the computer readable storage medium comprises a website.

6. A control system according to claim 3, wherein the computer readable storage medium comprises cloud storage.

7. A control system according to claim 1, wherein the human machine interface is mounted on the portable drill rig.

* * * * *